June 18, 1957 M. MACCAFERRI 2,795,988

COMPOSITE NECK AND FINGERBOARD COMPONENTS
FOR STRINGED MUSICAL INSTRUMENTS

Filed Oct. 28, 1954 7 Sheets-Sheet 1

INVENTOR:
Mario Maccaferri

BY Peck + Peck
ATTORNEYS.

INVENTOR:
Mario Maccaferri
BY Peck + Peck
ATTORNEYS

INVENTOR:
Mario Maccaferri
BY Peck + Peck
ATTORNEYS.

INVENTOR.

BY

ATTORNEYS.

COMPOSITE NECK AND FINGERBOARD COMPONENTS FOR STRINGED MUSICAL INSTRUMENTS

Filed Oct. 28, 1954

INVENTOR:
Mario Maccaferri

BY Peck + Peck

ATTORNEYS.

INVENTOR:
Mario Maccaferri

BY Peck + Peck
ATTORNEYS.

June 18, 1957 M. MACCAFERRI 2,795,988

COMPOSITE NECK AND FINGERBOARD COMPONENTS FOR STRINGED MUSICAL INSTRUMENTS

Filed Oct. 28, 1954 7 Sheets-Sheet 7

INVENTOR:

Mario Maccaferri

BY Peck + Peck

ATTORNEYS.

United States Patent Office 2,795,988
Patented June 18, 1957

2,795,988

COMPOSITE NECK AND FINGERBOARD COMPONENTS FOR STRINGED MUSICAL INSTRUMENTS

Mario Maccaferri, Rye, N. Y.

Application October 28, 1954, Serial No. 465,217

22 Claims. (Cl. 84—293)

This invention relates to composite neck and composite finger board components for stringed musical instruments, and particularly such instruments of the general guitar classes or types, as well as stringed musical instruments which present neck and fret or finger board conditions and functioning generally similar to those encountered with the guitar types of instruments.

The nature and objects of my invention will be readily recognized and understood from the following detailed description and explanation of the accompanying drawings illustrating what I at present consider to be preferred embodiments or mechanical expressions of the several features of the invention as applied to the neck components and the finger board components for stringed musical instruments; and especially such instruments of the fretted types, such embodiments or mechanical expressions having been selected from among various other forms, expressions, embodiments, modifications, designs, constructions and combinations of which the invention and the several features thereof are capable within the broad spirit and scope of the invention as defined and covered by the claims hereto appended.

This application is filed as a continuation-in-part of my co-pending application Serial No. 337,398, filed February 17, 1953, for Stringed Musical Instruments.

A general aim and object of my present invention is to provide a composite neck and fret or finger board component which can be readily manufactured by quantity production methods at relatively low cost while retaining for the component the necessary strength, weight and finish or appearance characteristics with precision of fret spacing.

A further object is to provide such a composite neck and fretted finger board component adapted to assembly and incorporation as the neck component for a variety of types of classes of stringed musical instruments utilizing systems of frets for finger stopping in the playing of the intrument.

Another object is to provide a design and construction of such a fretted neck component in which the body of the neck is molded of a suitable plastic material or composition with the fret or finger board portion of the component being comprised by a metal fret-forming plate member covered by a plastic jacket.

A further object is to provide such a neck component formed of a plastic composition body and a finger board thereon formed of a plastic covered metal fret-forming plate member with an arrangement of internal brace members or bars located within the neck component.

A further object is to provide a composite fretted finger board formed of a metal plate member having permanent metal frets pressed or formed-up therefrom in precision spacing and relationship on the outer side thereof with the outer, fretted side of the metal plate member being completely covered and jacketed by plastic but with the preformed frets exposed through the plastic to form therewith the fretted finger board as a completed component.

Another object is to provide such a preformed composite fretted finger board with brace and stiffening members or bars at the underside thereof for bracing engagement with the body of a neck in assembled position of the finger board on a neck body.

A further object is to provide such a fretted, composite neck component of a design and construction and of materials which can be precision produced at low cost and in completed condition for assembly in an instrument without the necessity of any substantial additional finishing operations thereon.

A further object is to provide such a neck component in the form of a hollow plastic body having a core of suitable material inserted and confined therewithin to substantially occupy the interior thereof.

Another object is to provide a composite fretted finger board as a separate component for attachment to and assembly with a neck component, or in the form of an integral part and top wall of a plastic neck component, of such a construction as to provide permanent frets in high-precision spacing on the finger board component to thereby eliminate the necessity for separately individually forming and separately mounting and spacing separate frets on the finger board.

A further object is to provide as a new article of manufacture for attachment to and mounting on a neck component of a stringed musical instrument, a composite fret board or finger board comprised of a metal plate from which a series of frets are formed-up in precision spacing on the outer side thereof with the outer side of the metal plate covered by a plastic wall or jacket firmly attached or keyed thereto and completely covering the plate between the frets but with the frets exposed therethrough to complete the component.

A further object is to provide such a composite neck and finger board component in which the neck body is comprised of plastic and has formed integrally therewith at the outer end thereof the tuning key mounting head with a core member or a system of brace bars mounted in and extending throughout the length of the neck body and a distance outwardly over said tuning key mounting head to brace and stiffen the neck component and the head.

Another object is to provide for limited angular adjustment of such a composite neck and finger board component relative to the body or bell of an instrument in those forms in which the plastic body of the neck component is integral with the plastic body or bell of the instrument.

And a further object is to provide such a composite neck and finger board component in which the body of the neck component is integral with the body or bell of an instrument with brace bars of the composite neck and finger board component connected with a simple adjusting mechanism by which limited adjustment of the neck component relative to the bell of the instrument may be made by effecting flexing between the integral bell and neck component of the composite neck and finger board component.

With the foregoing and various other objects, features and results in view which will be readily apparent from the following detail description and explanation, my invention consists in certain novel combinations and arrangements of parts, elements and components, and in the design and construction thereof, all as will be more fully and particularly referred to and specified hereinafter.

Referring to the accompanying drawings in which similar reference characters refer to corresponding parts throughout the several figures thereof:

Figure 9:
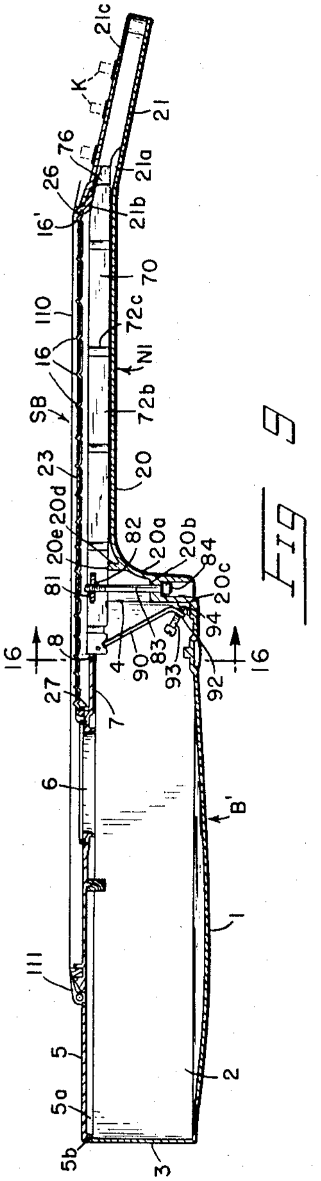

Fig. 9 is a longitudinal sectional view through a plastic guitar having a neck component and separate fretted finger board component assembled therewith in a form in which the body of the neck component is formed integral with the adjacent end wall structure of the bell or body of the guitar and in which an arrangement of bracing and stiffening bars is provided in the neck component with an adjusting mechanism in the guitar bell for changing the angle of the neck component relative to the bell.

Figure 5:
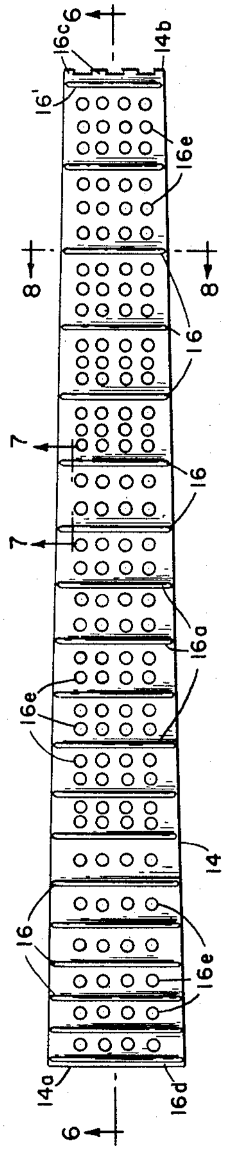
Fig. 5 is a view in top plan of the preformed metallic plate member having the permanent frets formed thereon of the composite finger board of the neck component of Figs. 1 and 2.
Figure 10:
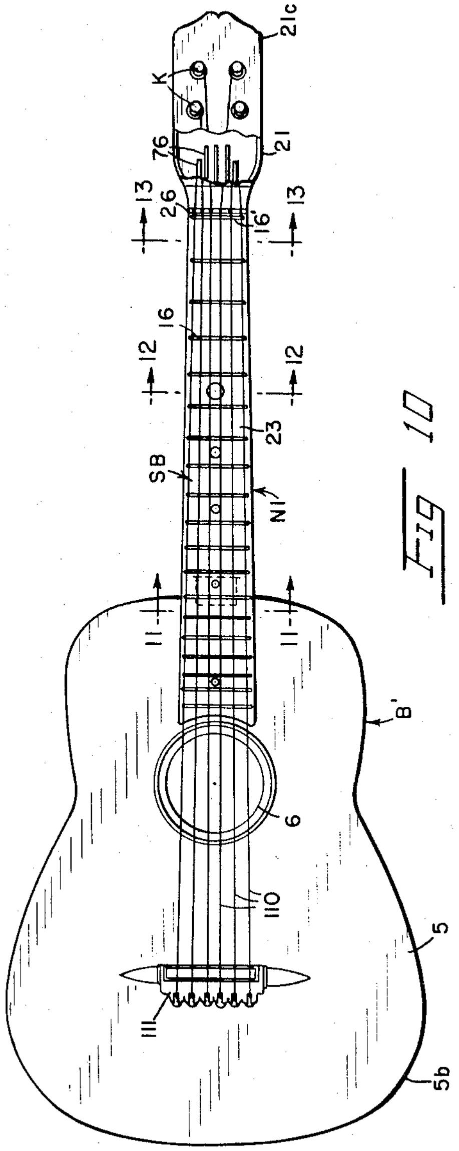

Fig. 10 is a view in top plan of the guitar and its neck and finger board component of Fig. 5.

Figure 11:
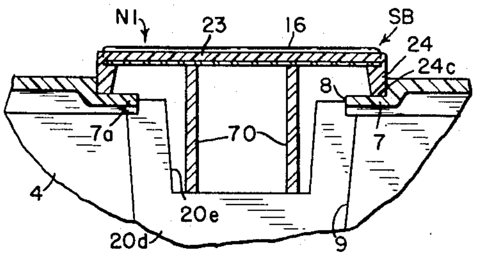

Fig. 11 is a transverse sectional view through the neck component and a portion of the guitar bell at the inner end of the neck component in its mounted position on the bell, taken as on the line 11—11 of Fig. 10, the adjusting plate being removed.

Figure 12:
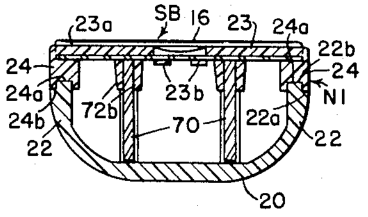

Fig. 12 is a transverse sectional view taken as on the line 12—12 of Fig. 10.

Figure 13:
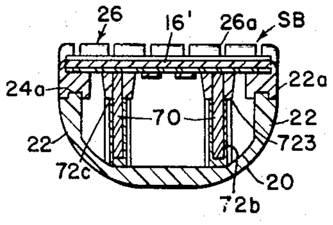

Fig. 13 is a transverse sectional view taken as on the line 13—13 of Fig. 10.

Figure 14:
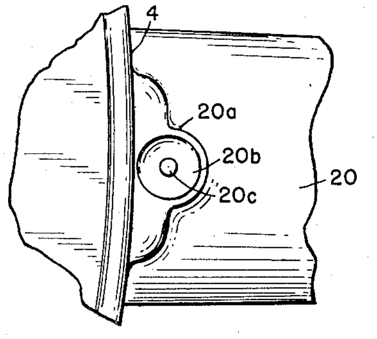

Fig. 14 is a fragmentary detail view in bottom plan showing the housing formed integral with the guitar bell for receiving the attaching bolt or screw by which the neck and finger board component is attached in assembled position on the bell.

Figure 6:
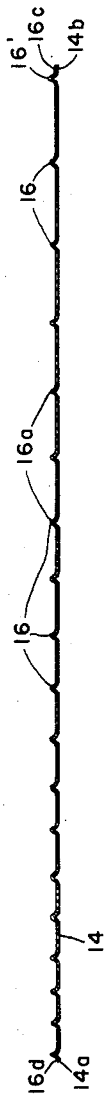
Fig. 6 is a longitudinal sectional view through the fret plate member taken as on the line 6—6 of Fig. 5.
Figure 15:
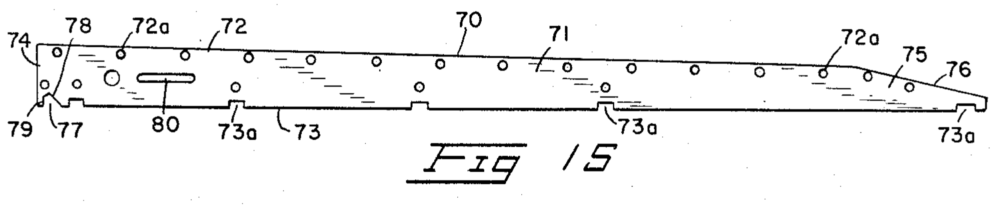

Fig. 15 is a view in side elevation of one of the metal bracing and stiffening bars of the finger board and neck component of Figs. 5 and 6.

Figure 16:
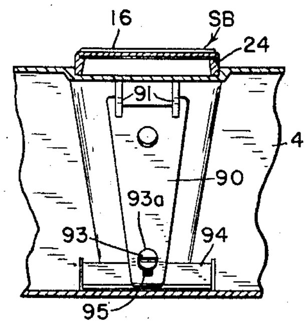

Fig. 16 is a view in end elevation of the inner ends of the bracing bars and the adjusting plate and adjusting screw and its mounting located at the inner side of the neck end of the bell.

Figure 17:
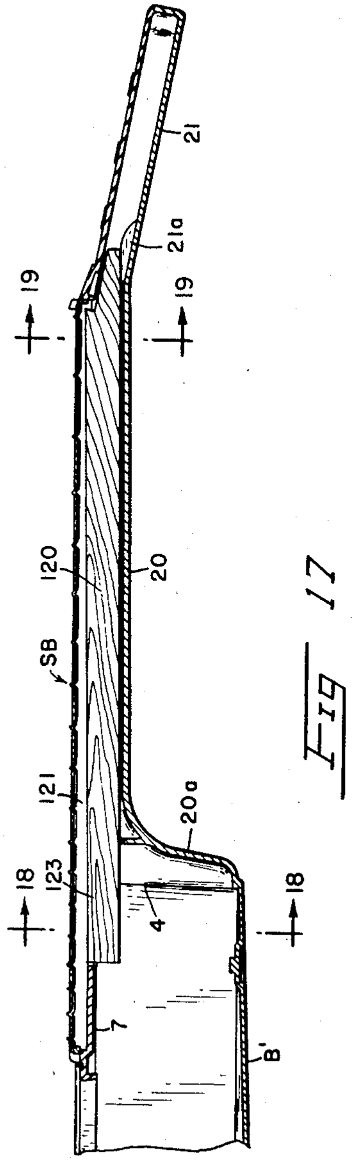

Fig. 17 is a longitudinal sectional view through a modified form of neck component of the type of Fig. 5 in which a wood core member is substituted for the bracing and stiffening bars of the neck component of Fig. 9.

Figure 18:
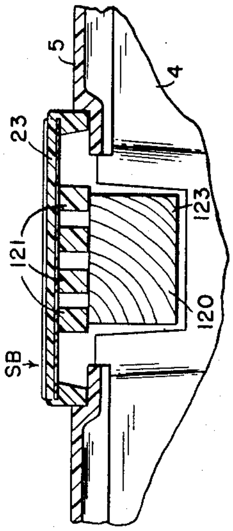

Fig. 18 is a fragmentary detail view in transverse vertical section taken through the neck component of Fig. 17 at the inner end of that component mounted on the guitar bell.

Figure 19:
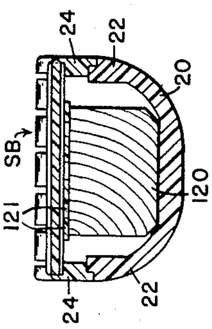

Fig. 19 is a detail view in transverse vertical section taken through the form of neck component of Fig. 17 adjacent the outer or head end thereof, as on the line 19—19 of Fig. 17.

Figures 20, 21:
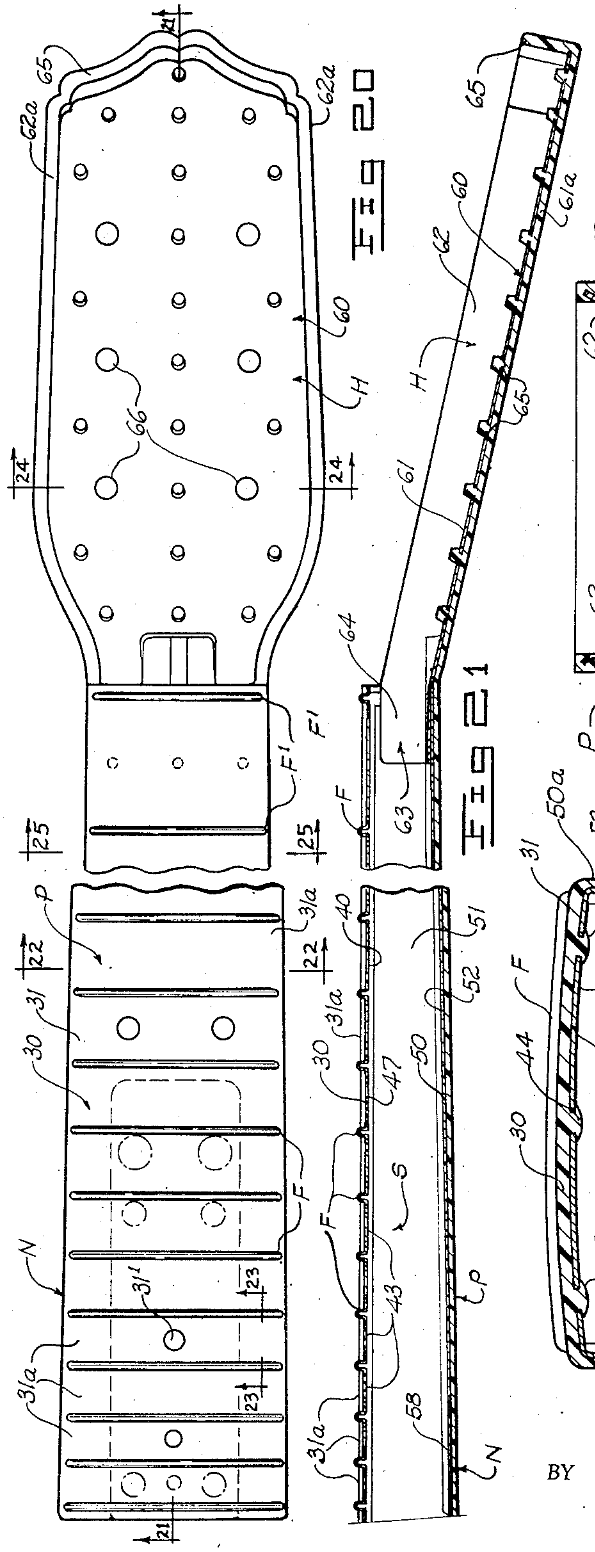

Fig. 20 is a view in top plan of another form of composite neck component embodying a plastic jacketed metallic shell with the preformed, metallic frets of the invention provided on the top wall of the metallic shell and exposed through the plastic jacket.

Fig. 21 is a view in longitudinal section through the neck component of Fig. 13, taken as on the line 21—21 of Fig. 20.

Figure 22:
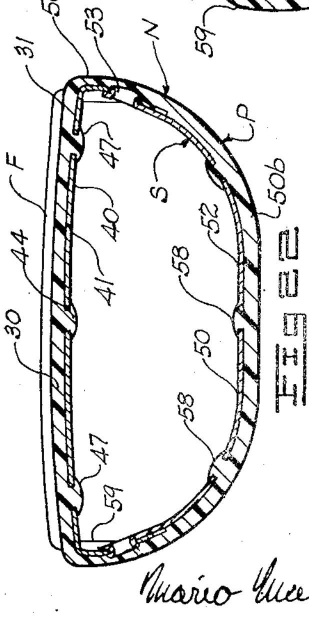

Fig. 22 is a view in transverse vertical section taken as on the line 22—22 of Fig. 20.

Figure 23:
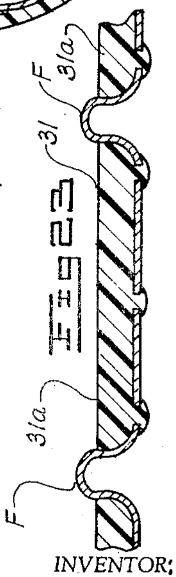

Fig. 23 is a detail vertical section taken as on the line 23—23 of Fig. 20.

Figure 24:
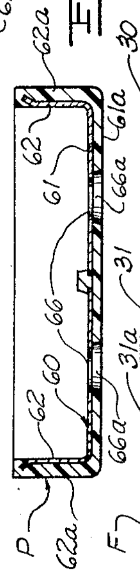

Fig. 24 is a view in transverse vertical section through the head member of the neck component, taken as on the line 24—24 of Fig. 20.

Figure 25:
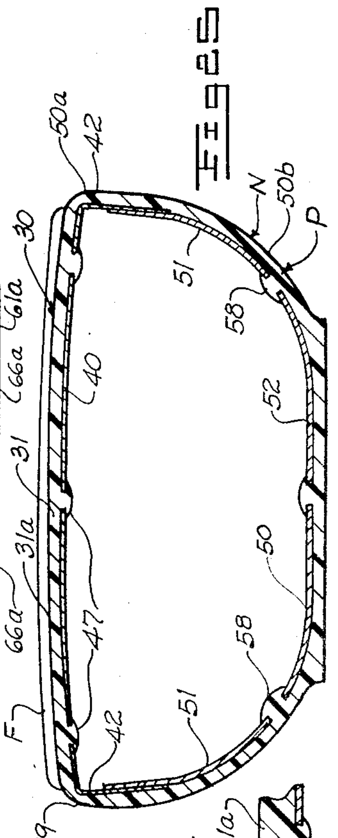

Fig. 25 is a view in vertical transverse section through the neck component, taken as on the line 25—25 of Fig. 20.

Figures 26, 27, 28, 29, 30, 31, 32:
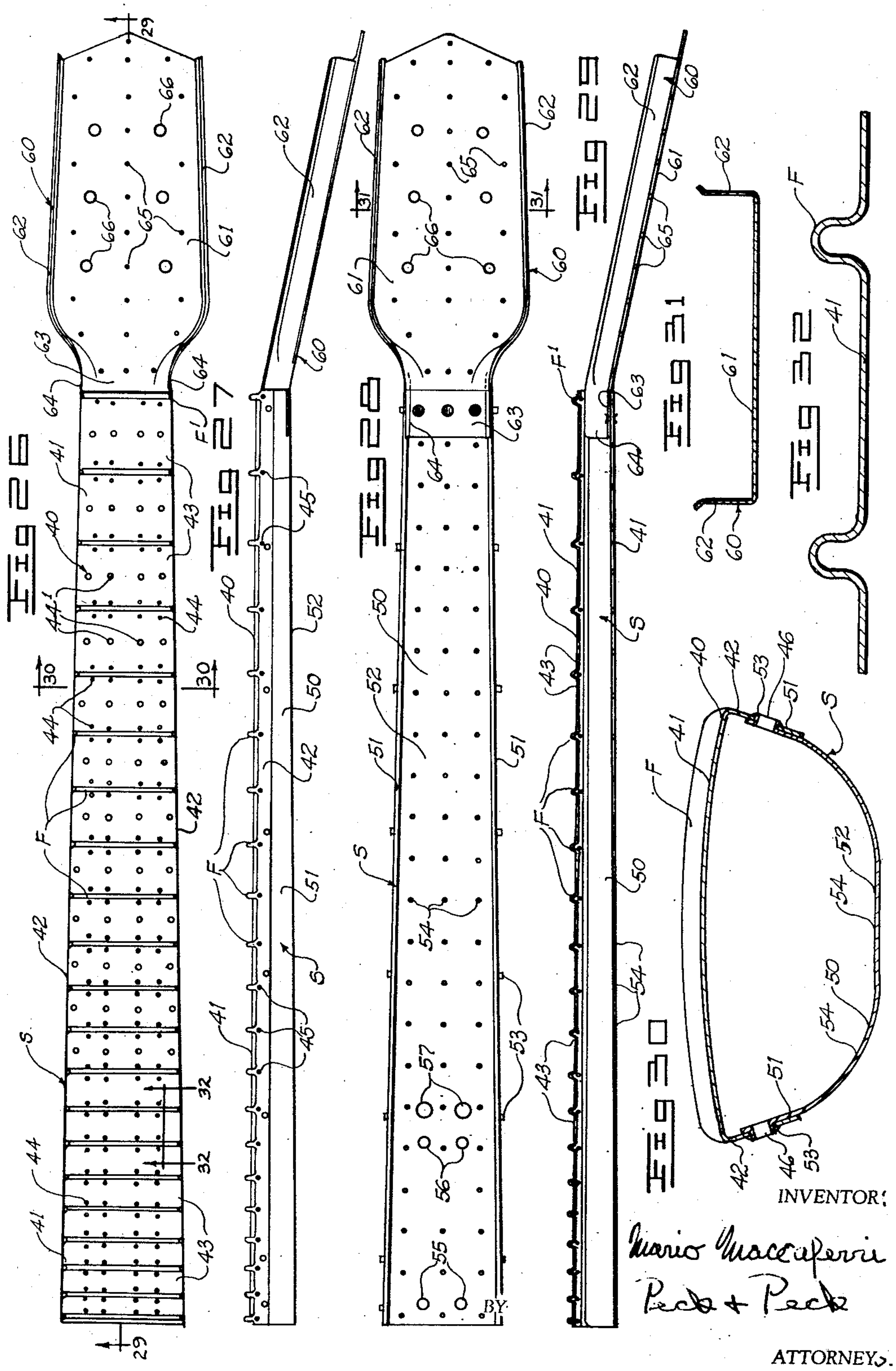

Fig. 26 is a view in top plan of the preformed hollow metallic shell of the composite neck component of Fig. 20.

Fig. 27 is a view in side or edge elevation of the shell of Fig. 26.

Fig. 28 is a view of the shell of Fig. 26 in bottom plan.

Fig. 29 is a view in longitudinal section through the shell of Fig. 26, taken as on the line 29—29 of Fig. 26.

Fig. 30 is a transverse sectional view through the shell taken as on the line 30—30 of Fig. 26.

Fig. 31 is a transverse sectional view through the head forming portion of the shell taken as on the line 31—31 of Fig. 28.

Fig. 32 is a detail, fragmentary view through the upper fret forming wall of the shell taken as on the line 32—32 of Fig. 26.

As example embodiments of composite neck components and fretted finger board components of my invention, I have selected and illustrated and described herein such components in forms particularly adapted for assembly as the neck and finger board components of stringed musical instruments of the guitar types, and specifically to combination with guitar bells or bodies of the plastic forms of my invention as disclosed in my above-identified co-pending U. S. application Serial No. 337,398 of which this application is filed as a continuation-in-part. While I have illustrated and described composite neck and fretted finger board components adapted for use as such components in stringed musical instruments of the guitar types, it is not intended by such selection and disclosure to thereby limit components of my present invention to such types of instruments, as they are adapted to use in other types or classes of stringed musical instruments and such adaptations are contemplated and included within the scope of this disclosure. Similarly, neck and fretted finger board components of this invention are not in any sense limited and restricted to use with stringed musical instruments utilizing bells or bodies in accordance with my aforesaid co-pending application Serial No. 337,398, or to bells or bodies formed of plastic materials, as such neck and finger board components may be utilized with bodies or bells of stringed musical instruments without regard to the particular materials or to the particular construction of such bodies or bells.

While one of the important features of my present invention resides in the provision of permanent frets pressed or otherwise preformed from or on a metallic plate element of a composite fret or finger board, as an integral part of such plate element in precise spacing thereon, my invention in its broader aspects as it relates to the composite character of a neck and finger board component or of a finger board component per se for assembly and attachment on a neck, contemplates and includes neck and finger board components of the non-fretted types such as are generally utilized with stringed musical instruments of the broad violin class. By utilizing the composite neck and finger board structures in accordance with the broad aspects of my invention, the advantages of light-weight with strength and precision of form adapted for relatively low cost quantity production can be obtained for the non-fretted forms of the invention.

Figures 1, 2, 3, 4:
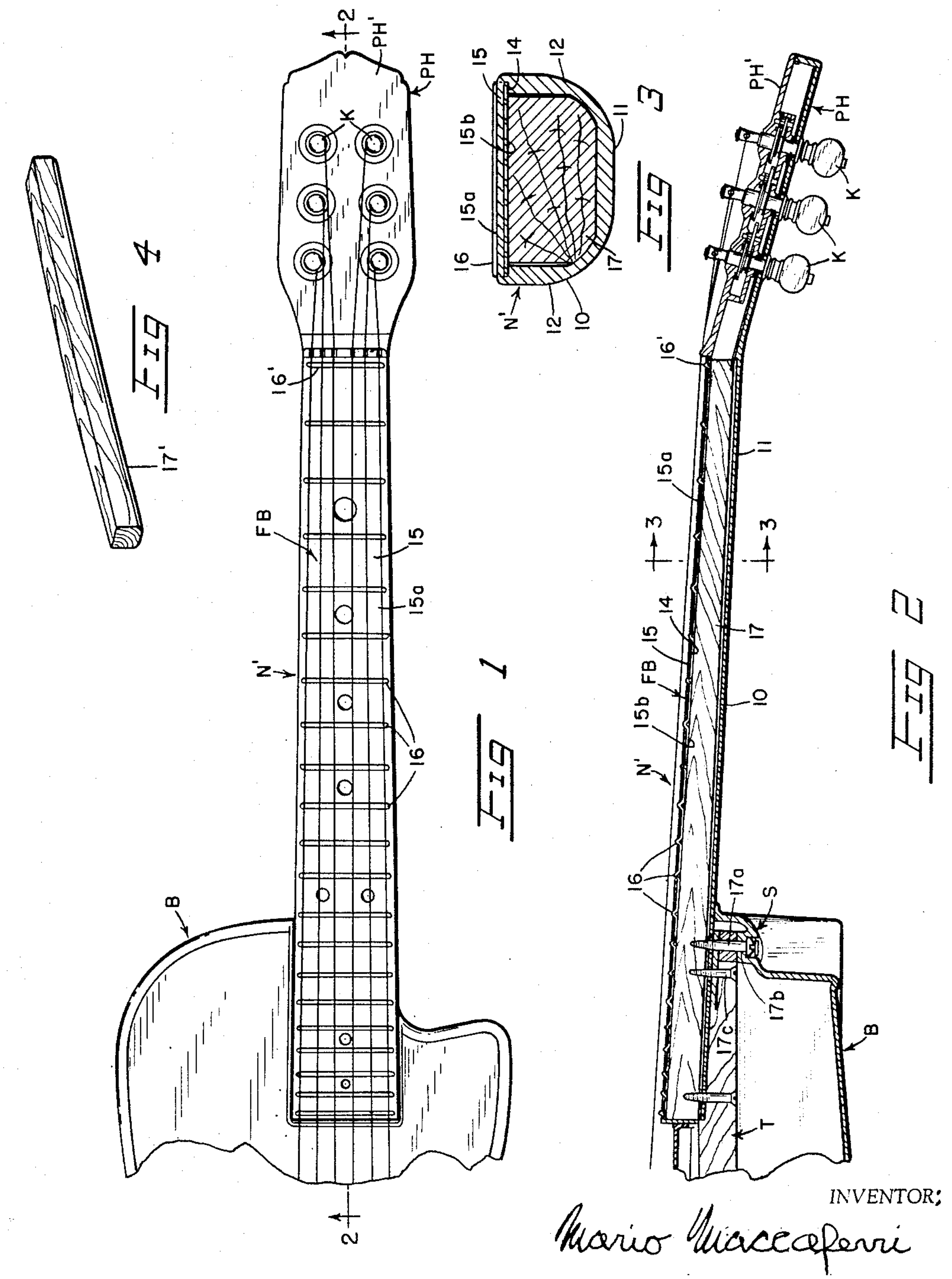
Fig. 1 is a top plan view of one form of separate composite neck and finger board component embodying my invention in seated assembled position attached to the body or bell of a guitar, the neck mounting end portion only of the guitar bell being shown.
Fig. 2 is a longitudinal sectional view through the neck and finger board component taken as on the line 2—2 of Fig. 1.
Fig. 3 is a transverse section through the neck and finger board component taken as on the line 3—3 of Fig. 2.
Fig. 4 is a perspective view of a modified form of core piece for a neck component of the form of Figs. 1 and 2, in which the core piece therefor is slightly arched.

The composite neck components in accordance with my present invention may take the form of separate units for attachment to and assembly with an instrument bell or body, as in the examples illustrated herein in Figs. 1 and 20, or may be expressed in a form as illustrated in Figs. 9 and 17 in which the neck component is made up of a neck body formed integral with the instrument bell or body and the neck is completed by a composite fret or finger board of the invention formed as a separate element attached on and to the neck body. Thus, with the forms of separate components they may be designed and manufactured for use with new instruments or may be furnished as replacement or substitute neck components for instruments already in use. And as to the composite fret or finger board per se, as in the form shown in Fig. 9, such finger boards may be manufactured and sold for use in assembling new instruments or may be used as replacements for other types and forms of finger boards in use.

In the embodiment illustrated in Fig. 1, the neck component N′ is formed as a separate entity or unit and is mounted on and attached in assembled position to a guitar body or bell B which happens to be in this instance of the design and construction as disclosed in my above identified co-pending application Serial No. 337,398 in which one end wall of the body provides a saddle structure S for receiving and seating the neck component N′ in position on the bell. The neck component is comprised of the body 10 molded from a suitable plastic such as a polystyrene plastic composition to provide an open top, primary body structure of general U-shape in cross section consisting of the bottom wall 11 and the opposite side walls 12 molded integrally therewith.

In this particular example the plastic body 10 of the neck component N′ has formed as a part thereof and integral therewith at the outer end thereof the plastic head PH for mounting thereon the string tuning keys of the instrument with which the neck component N′ is assembled. This head PH extends outwardly in forward and inwardly inclined position from the outer end of the bottom wall 11 of the body, as will be clear by reference to Fig. 2. In the complete assembly of the instrument of which the neck component N′ provides the neck or handle, suitable tuning keys K are mounted on the head PH in an assembly with a head cover PH′ in a general manner familiar in this art and which may, if desired, follow the construction, arrangement and assembly as shown in my aforesaid co-pending application Serial No. 337,398.

The neck component N′ is for use with a stringed musical instrument of the type providing frets on a finger board basically carried by the neck of the instrument, and in the illustrated embodiment this neck component N′ of my present invention provides such a fretted finger board identified generally by the reference character FB. In accordance with an important feature of my invention this fretted finger board FB of the neck component N′ is a composite structure comprised of a fret plate member 14 stamped, pressed, or otherwise formed from brass sheet to provide permanent frets thereon integral therewith and a plastic material jacket or covering 15 over the outer side thereof, which plastic jacket in this particular example may be formed as, in effect, the top wall of the plastic body 10 of the neck with this jacket or covering being formed integral with and extending across and between and joining the opposite side walls 12 of the plastic neck body, or formed separately with plate 14 and cemented or otherwise secured to walls 12.

The neck component N′ is of progressively decreasing width and depth or thickness from its inner end at the bell B to its outer end from which the head PH extends, in accordance with more or less conventional shape and contour design practice in order to form a neck which can be readily received and held within the hand of the player for facility of string stopping in playing an instrument. The head PH and the head cover PH′ are of a width throughout the major length thereof greater than the width of the neck component N′ at its outer end and are joined with the neck component by a portion of progressively decreasing width inwardly to the neck component, as will be clear by reference to Fig. 1.

The metallic, in this instance brass alloy, fret plate member 14, referring now to Figs. 5, 6, 7 and 8, is formed of a progressively decreasing width from the inner end 14*a* to the outer end 14*b* thereof to correspond with the decreasing width from the inner end to the outer, head mounting end of the neck component with which it is to be used, such for example as the neck component N′. The fret plate member 14 is formed of a length substantially equal to the length of the neck component with which used, as constituted by the distance between the inner end of the neck component and the outer end thereof from which the head extends in outward continuation thereof. With the fret plate member 14 dimensioned for the neck component N′, the widths throughout the length thereof are less than the external widths of the plastic neck body 10 at corresponding locations therealong but are preferably greater than the internal widths of the neck body at such corresponding locations, respectively, that is, the distances between the inner surfaces of the side walls 12 of the body 10 along the length thereof, as will be clear by reference to Fig. 3.

The metal fret plate member 14 is formed in this example by pressing, stamping or drawing-up therefrom the series of transversely disposed, precisely spaced, permanent metallic frets 16 and 16′, the frets being spaced apart in parallel relationship along and throughout the length of the fret member. The fret 16′ is located at and across the outer end 14*b* of the fret plate member 14 to form and provide in the composite finger board FB of the neck component N′ of Fig. 1, or the separate composite finger board SB of neck component NI of Fig. 9, a so-called first or "master" fret. The frets 16 of a fret plate member 14 are spaced decreasing distances apart inwardly along the fret plate member from the master fret 16′ to the inner end fret 16 located at and across the inner end 14*a* of the fret plate member 14.

The composite finger board FB of the neck component N′ for the instrument of Fig. 1 happens to have twenty-one (21) frets, being the number of frets required or found desirable for the particular dimensions and stringing of the instrument of Fig. 1. The spacing of the frets 16 and 16′ making up the twenty-one (21) frets of the neck component N′ of Fig. 1, is in accordance with standard fret spacing systems for the particular instrument with which the composite finger board FB is utilized. However, such fret spacing may be in accordance with any other desired system of spacing, as the fret spacing employed is not critical to my present invention which is concerned only with the precision of spacing of any spacing arrangement selected obtainable with the permanent, preformed metallic frets to meet the requirements of the selected spacing system.

The fret plate member 14 disclosed in detail in Figs. 5, 6, 7 and 8, is formed to provide only nineteen (19) frets which may be considered to be spaced in accordance with a standard fret spacing system, and which constitutes a fret plate member specifically designed and intended for use in making up the separate fretted finger board SB for the composite neck NI of the instrument of the dimensions and stringing of Fig. 9, all as will be referred to hereinafter. However, it is to be considered and understood that the fret plate member 14 of Figs. 5 through 8 with its system of nineteen (19) frets, is, except for the addition of two (2) more frets and the corresponding length and inner end width dimension changes, identical in design, construction, fabrication and functioning with such a fret plate member 14 for the finger board FB as shown in Fig. 1. Without regard to the number of frets employed or the fret spacing system utilized, the important factor insofar as my present invention is concerned is that by thus preforming the frets 16 and 16′ from the metallic fret plate 14 as integral and permanent parts thereof, a very high precision and accuracy of spacing may be obtained which precision spacing will be maintained throughout the life of the instrument. As will be recognized and appreciated by those skilled in the art, it is an essential to maximum musical efficiency and ease of playing of fretted stringed musical instruments to have precisely accurate fret spacing which is maintained at all times and under all conditions of using and playing an instrument.

Figure 8:
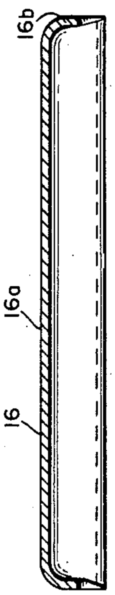
Fig. 8 is a detail sectional view transversely of the fret plate and longitudinally through a fret thereof taken as on the line 8—8 of Fig. 5.
Figure 7:
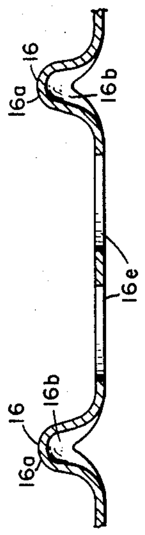
Fig. 7 is a detail sectional view taken transversely through a pair of adjacent frets of the fret plate member, as on the line 7—7 of Fig. 5.

Referring to Figs. 5, 7 and 8 in particular, each of the frets 16 and 16' is formed of the same design, shape and cross-sections along its length with each fret extending substantially completely across the fret plate as a drawn or pressed-up rib or ridge thereacross presenting its outer or top edge surface **16*a* as being formed on a radius to thus present a smoothly rounded string contact surface having its longitudinal center spaced from adjacent frets with precision to thereby determine accurately the playing length of a string being stopped. Each of these permanent, integral precisely positioned frets of the fret plate member 14 is formed at its opposite ends to be partially closed by an end wall 16*b* which forms an inward continuation of the rounded top contact edge forming wall 16*a*. At the reduced width outer end 14*b* of the fret plate member 14 at the outer side of and immediately adjacent to the master fret 16', the plate is provided with a plurality of spaced outwardly extended dovetail tabs or tongues 16*c* (see Fig. 5) which function to key the forward end of the plastic jacket or wall 15 to the fret plate. At the opposite or inner maximum width end of the fret plate 14 the plate provides an outwardly extended flange portion 16*d* of relatively narrow width across the plate and immediately adjacent to and joining with the innermost fret 16**, as will be clear by reference to Figs. 5 and 6 in particular.

For the purpose of firmly keying and locking the plastic jacket or covering 15 on, to and over the outer side of the fret plate 14, the plate is formed with a multiplicity of circular openings or bores **16*e* therethrough in the portions of the plate areas between the spaced frets 16 and 16' throughout the length of the fret plate. In this particular example these bores or apertures 16*e* are arranged in rows transversely across the fret plate, there being three (3) rows of four (4) openings each between the frets of widest spacing, that is, the frets on the outer end length of the plate and the number of rows is reduced to two (2) along the intermediate length of the plate between the less widely spaced frets on that portion of the plate, while only a single row of apertures 16*e* is provided in the space between the 13th through the the 19th frets at the inner end length of the fret plate 14** where the minimum spacing between frets is found.

The fret plate 14 of the specific example shown in detail in Figs. 5, 6, 7 and 8 which forms an element of the composite finger board SB of the neck component NI which is primarily designed and intended as the neck component for the specific size of guitar bell or body of the guitar of Figs. 9 and 10 has a length of 14.949" between the center of the first or master fret 16' and the 19th fret 16 which is located at and across the inner end **14*a* of the fret plate. The fret plate 14 in this specific form is made of soft brass sheet having a thickness of .020" and this plate is of a width which progressively decreases from a width of 1.587" at its minimum width at the outer end 14*b* to its maximum width of 2.152" at its inner, maximum width end 14*a*. Each of the frets 16 is of a depth or height to position its central contact portion of the contact surface 16*a* a distance of .100" above the plane of the outer surface of the fret plate 14. However, the first or master fret 16' is formed of slightly greater depth or height, in this instance having the center of its outer contact surface spaced a distance outwardly from the plane of the outer surface of the fret plate of .110". In the fret plate 14 of this specific example there are nineteen (19) frets including the first or master fret 16' while the bores or circular apertures provided through the fret plate between the frets have a diameter of ⅛". The foregoing dimensions of the major elements of the fret board 14 for the finger board SB are not given by way of specific limitation or as necessarily critical dimensions, even though the fret plate 14** made in accordance therewith is considered to have maximum structural and musical efficiency for the particular example of guitar neck component in which it is used. Obviously, fret plates for other finger boards and neck components for different instruments than the example instrument will vary to meet the conditions of such other instruments although the general relationship and ratios between the given dimensions will preferably be maintained.

The fret plate member 14 for the neck component N' of the attachable form shown in Fig. 1 and the fret plate member 14 as specifically shown in Figs. 5, 6, 7 and 8 for the neck component NI of Fig. 9, are in all substantial respects identical, except for dimensional factors, and are considered as the full structural, mechanical and functional equivalents of each other. The formation of a composite finger board with a fret plate member 14, whether dimensioned for the instrument of Fig. 1 or dimensioned for the instrument of Fig. 9, only differ in the longer length, widths and fret spacing of a member 14 for making up the composite neck component N' of Fig. 1, as compared with the corresponding dimensions and number of frets for a member 14 for the separate finger board component SB for the neck component NI for the instrument of Fig. 9.

The neck component N' in the form shown may be considered to include the finger board FB as an integral, inseparable part of the plastic body 10 of the neck component. The fret plate 14 is positioned on and across and forms a part of the upper side wall of the neck body 10 and is completely covered and jacketed by the plastic material 15 which extends laterally or transversely thereover and thereacross between the spaced frets 16 and 16' which are formed-up from the fret plate with the plastic jacket or wall 15 along opposite side edges thereof joining and being formed integral with the plastic material, spaced side walls 12 of the neck body 10. The covering plastic wall or jacket 15 thus completely occupies the spaces between the frets 16 and 16' on the outer side of the fret plate member which extends from end to end of the neck body 10 to thereby form and provide as the top wall of the neck the composite finger board FB having the permanent, precisely spaced metallic frets 16 and 16' exposed through the covering wall 15 and extending the required slight distances outwardly therebeyond for selective and precision engagement by the strings in the playing of the instrument.

The plastic jacket 15 which forms the top covering wall of the neck component N' and provides the finger stopping surface **15*a* of the finger board FB against which the strings are stopped by the fingers of a player, is firmly and rigidly keyed and locked on and to the fret plate member 14 by sprues of plastic 15*b* which extend through and occupy the circular openings or bores 16*e* in the portions of the plate between the spaced frets 16 and 16'. The finger board FB in the example neck component N' of Fig. 1 is formed to provide the inner or under surface of the fret plate member 14 as exposed and uncovered by any plastic wall or jacket, except insofar as the plastic sprues in the keying bores 16*a*** are occupied by plastic and may be spilled slightly therefrom and therearound onto the underside of the plate member. However, it is to be understood that if desired or found expedient in any particular instance, the finger board FB may be formed to provide a plastic coating or jacket over and across the underside thereof.

The neck component N' which includes the finger board FB, in the form thereof shown in Fig. 1, is provided with a core piece or filler member 17 which has external dimensions to fully occupy and fill the neck component within the body 10 and the finger board FB from end to end thereof with the outer end thereof extending to and terminating in a plane at the transverse plane of the outer end of the finger board FB. This core piece or filler member 17 has external dimensions transversely therealong to have an external shape conforming and corresponding to the transverse or sectional contours of the space within the hollow neck component with the outer side of the core being formed substantially flat for seating thereagainst of the underside of the finger board FB. While this core piece or filler member 17 may be formed of any suitable material, in the specific example hereof, it is formed of a suitable wood. Thus the neck component N', including the finger board FB, is formed as a separate complete component for attachment to and assembly as the neck component of any desired or suitable stringed musical instrument for which its dimensions and fret spacing and arrangement may be adapted. This unit, while it may preferably include a core piece or filler member 17, may be formed without such core piece, as a hollow structure for attachment as such to the body or bell of an instrument.

Referring now to Figs. 1 and 2, the neck component N' incorporating the finger board FB is illustrated as attached to and assembled in operative position with a guitar body or bell of the type and construction of my above referred to pending application Serial No. 337,398. The neck component is mounted in assembled position seated on the saddle S of the bell B and is rigidly attached in such position by the wood screws **17*a* extended upwardly through the bores 17*b* in saddle structure S and threaded into the wood core piece or filler member 17. The inner end of the neck component in this example is attached to a support bar T by wood screws 17*c*** in accordance with the disclosures of the aforesaid application Serial No. 337,398.

In accordance with another feature of that form of my invention which provides the core piece or filler member 17 in the neck component, such as in the form thereof shown in Figs. 1, 2 and 3, the core piece or filler member may be slightly bent or curved longitudinally to give to it a slight longitudinal arching. A core piece or filler member 17' having such an arched form is shown in Fig. 4 of the drawings with the arching such that the convex side of the core is at the upper, flattened side of the neck component, that is, the side on which the underside of the finger board FB is engaged so that the arching is in a direction in which the tension forces are applied to the neck component N' by the playing strings of the instrument when in their normal condition of tension for playing. In the event that the neck component in the form of N' is molded with the core piece or filler member 17' in the mold, then the mold may be formed and designed to give to the plastic neck body 10 and finger board FB a longitudinal curvature or arching substantially on the same radius of curvature as that preformed into the core piece or filler member. In the event that the plastic body 10 and finger board FB are molded as a hollow component without any core piece and the core piece or filler member 17' is inserted after the neck component has been molded and removed from the mold, then such arching or curvature of the core piece will effect a correspondingly slight arching of the plastic body 10 and fret plate member 14 and plastic jacket 15 forming the finger board FB of the neck component N'. The degree of longitudinal curvature or arching of the core piece or filler member 17' and the neck component N' in any particular instance will be such that upon tuning the playing strings of the instrument the tension forces applied to the cored neck component will be resisted by the arched core piece but will act in a direction to overcome the slight arching and thereby tend to bring the neck component toward a straightening position.

In another form and construction of neck component and composite fretted finger board of my present invention, referring now to Figs. 9 and 10, the neck component NI has the body or handle portion thereof molded integral with the guitar body or bell B' while the composite finger board component SB is formed as a separate unit cemented or otherwise secured on and to the body of the neck component.

The guitar bell B' of Fig. 9 is formed preferably of a suitable plastic material such as a polystyrene thermoplastic composition and provides an integral wall structure comprised of the belled bottom wall 1 having opposite side walls 2 (one only of which is shown), the outer end wall 3 and the inner end wall structure 4. The bell B' thus provides a hollow open top wall structure and a sounding board-forming plastic material top wall 5 is positioned on and over the outer edges provided by the walls 2, 3 and 4 which surround the open side of the basic wall structure. This top wall or sounding board 5 may have a laterally extending flange **5*a* therearound on the inner side thereof adjacent but inset from the surrounding outer edge of the top wall. The flange 5*a* is so located and dimensioned as to fit down into the open side of the bell B', preferably with a slip fit, along the inner sides of the walls 2, 3 and 4 adjacent the outer edges thereof with the surrounding outer edge portion forming the shoulder 5*b* of wall 5 being seated upon the outer edges of the walls 2, 3 and 4. So mounted and assembled the top wall or sounding board 5 is cemented directly to the adjacent contacting portions of the bell wall structure by a suitable solvent or "welding" type of cement. The sounding board-forming top wall 5 may be provided with the usual sound opening 6** therethrough of circular shape.

The sounding board 5 is provided at the neck end thereof with an inset seat-forming, wall portion 7 having the outer surface thereof parallel with but spaced inwardly from the plane of the main outer surface of the sounding board, as will be clear by reference to Figs. 9, 11 and 16. The inset wall 7 extends outwardly to and through the adjacent end edge of top wall 5 and is provided with an inwardly extending generally rectangular opening 8 centrally located therein of a width less than the width of that portion of the inset wall 7 through which it extends so that there are formed along opposite sides of opening 8 the outwardly extending, spaced seating flanges **7*a* as forward continuations of the inwardly located, unbroken main portion of wall 7. The opening 8 through the inset wall 7 extends inwardly from its opening through the adjacent, neck mounting end of body B' to approximately the midway point of wall 7. The end wall 4 of the bell B' is inwardly cut out to provide the opening 9** for receiving therethrough the system of bracing and stiffening bars or members of the composite neck component N', as will be referred to hereinafter.

The plastic body 20 of the neck component NI is of U-shape in cross-section open along the outer or top side thereof and is molded at its inner end integral with the end wall 4 of the integral wall structure making up the bell B'. At its outer end the neck body 20 has molded integrally therewith in outward but inwardly or rearwardly inclined continuation thereof, the head 21 for the instrument. Thus the bell B', the neck body 20 and the head 21 of the neck component NI form and constitute an integral, one-piece structure. The neck body 20 immediately adjacent the end wall 4 of bell B' is formed of sharply increasing depths to provide a stiffening and supporting buttress structure **20*a* formed of a curved wall having its spaced opposite side edges joining and integral with the bell end wall 4, the curved wall structure 20*a* being open at the bottom or lower side thereof. A transverse wall or web 20*b* is formed integral with end wall 4 and the buttress forming wall 20*a* in position extending therebetween and inset a distance inwardly from the lower open side of the wall 20*a*. This transverse wall 20*b* is provided with a bore 20*c* therethrough for receiving a suitable attaching screw or bolt, as will be referred to hereinafter. Preferably, a transverse bulkhead forming wall 20*d* is provided integral with the neck body structure in position extending across the interior thereof adjacent but spaced a distance rearwardly from the bell end wall 4. This wall 20***d* is cut away inwardly to provide the opening 20*e* therethrough which opens through the top thereof and which is in general alignment with the opening 9 in the bell end wall 4 for the purpose of receiving therethrough the system of bracing and stiffening bars, as will be later described.

With the composite neck component of the form of Figs. 9 and 10, where a separate finger board SB is mounted and attached in assembled position on and to the neck body 20 and bell B′, the opposite side walls 22 of body 20, referring now to Figs. 12 and 13, are formed with shoulders 22*a* forming seats extending longitudinally therealong at and open through the exterior sides thereof. The outermost edges of the walls 22 are inset laterally from the shoulders 22*a* and extend outwardly a slight distance therebeyond to form seats 22*b* along and completely throughout the length of the neck body 20.

The separate neck component SB is formed as a composite structure which includes a fret plate 14 of the specific construction and dimensions, as illustrated in Fig. 5, which provides the preformed permanent metallic frets 16 and 16′ spaced apart therealong, with this fret plate 14 being completely covered at the outer side thereof along and between the spaced frets by the plastic wall or jacket 23. The outer surface 23*a* of the plastic wall 23 provides the major surface of the finger board SB between the frets 16 and 16′ which are exposed therethrough and thereacross in the manner as hereinabove described in connection with the composite finger board FB of the form of Figs. 1 and 2 hereof. However, with this separate type of composite finger board SB the plastic outer covering wall or jacket 23 is molded or otherwise formed with depending, that is, inwardly extending, opposite side edge walls or flanges 24 which are disposed in planes generally normal or at an angle to the plane of the fret plate 14 and the covering wall or jacket 23 thereover. The inner edges of the opposite side walls 24 are formed with grooves 24*a* extending longitudinally therealong of a width and depth to receive and seat therein the inset flanges 22*b* of the opposite side walls 22 of neck body 20. The opposite side walls 24 of the composite fret board SB provide by the longitudinal edges thereof at the outer sides of the grooves 24 therein, the longitudinal seating surfaces 24*b*, respectively, which engage and seat upon the longitudinally disposed seats 22*a* along the opposite side walls 22 of the neck body 20. These longitudinally disposed seating surfaces 24*b* of each side wall 24 extend from the outer, minimum width end of the fret board SB to a location spaced a distance inwardly from the inner end of the finger board. From a location adjacent the ends of the grooves 24*a* and the seating surfaces 24*b*, the side walls 24 provide along their inner edges the full width seat forming edge surfaces 24*c*, as will be clear by reference to Figs. 9, 11 and 16.

The finger board SB at the outer head end thereof is provided with an outwardly extending string divider or nut 26 disposed transversely thereacross and forming the outer end wall of the finger board component. This string divider 26 extends for the full width of the outer end of the finger board and is provided with the transverse string receiving slots 26*a* therein (see Fig. 13). The first or master fret 16′ is located along and in immediate proximity to the string divider 26 at the inner side thereof in accordance with the U. S. Letters Patent Nos. 2,649,828 and 2,664,022 issued to me as patentee on August 25 and December 29, 1953, respectively.

The finger board SB at the maximum width, inner end thereof, is provided with an inwardly turned wall-forming flange 27 extending transversely thereacross and molded integrally with and forming a part of the plastic covering wall or jacket 23 of the finger board. (See Fig. 9.) This end wall 27 is of less depth than the side walls 24 of the finger board and extends transversely across the full width of the finger board on a radius of curvature which is preferably approximately the same as the radius of curvature of the sound opening 6 in the sounding board 5 of the body B′. (See Fig. 10.)

The plastic covering wall or jacket 23 is keyed and locked rigidly on and to the metal fret plate member 14 by sprues 23*b* (see Fig. 12) of plastic integral with jacket 23 and extending through and occupying the keying holes 16*e* in the plate member. Thus the wall or jacket 23 is firmly attached and keyed to the plate member 14 throughout the length of the latter in a rigid, bonded relation such that there can be no relative movement or play between the jacket and the plate member in any portions thereof or locations therealong. In addition to the keying by the sprues 23*a*, the fret plate 14 and the jacket 23 are further rigidly bound together by the longitudinal side edges of the fret plate which extend distances into and are embedded and keyed in the opposite side walls 24.

With this form of integral neck body and instrument bell having separate composite fret board SB mounted and secured thereon, I provide a system of bracing and stiffening bar members 70 which are bonded to and along the underside of the fret plate 14. Such bracing bars with the fret board SB in assembled position secured on the neck body 20 provide longitudinally disposed bracing components which extend through the composite neck NI to form and complete therewith a box girder type of structure. In the instant example I utilize two (2) of such bracing bar members 70 and I bond them in spaced, parallel relation along the underside of the fret plate 14 of the composite fret board SB in positions disposed outwardly therefrom normal to the plane of the fret board. The bracing bars 70 have a depth or width such that in assembled position of the fret board SB on and attached to the neck body 20 the outer free longitudinal edges of the bars 70 will seat upon the inner surface of the bottom wall of the neck body 20 and thus be engaged and form rigid bracing between the bottom wall of the neck body 20 and the underside of the composite finger board SB. The fret plate 14 and the bracing bars 70 may be placed in the mold in which the composite finger board SB is to be formed and during the molding of the plastic therein are bound and keyed together with and through the medium of the plastic covering wall or jacket 23 and certain additional plastic binding and tying structure in direct keyed relation with the bracing bars, so that the structure which is removed from the mold is in the form of a composite finger board comprised of the fret plate 14, the plastic covering wall 23, and the bracing bars 70 fixed in parallel relation extending outwardly from the side of the finger board longitudinally throughout the length thereof.

The bracing bars 70 of this example are identical. Referring now to Fig. 15 of the drawings, each bracing bar is in the form of a rigid, flat strip or plate-like-bar 71 having the longitudinal edge 72 thereof which is engaged and keyed against the underside of the fret plate 14, inclined at a relatively low angle to the opposite or outer edge 73 thereof which is to seat upon the inner side of the bottom wall of the plastic neck body 20. Such inclination of the longitudinal edge 72 is in a direction from the inner or instrument body end 74 of the bar to the outer head end 75 thereof. The head end 75 of each bracing bar 70 is formed with its longitudinal edge 76 in outward continuation of edge 72 but at a sharply increased angle of inclination to that of the edge 72. At spaced intervals along the outer longitudinal edge 73 the plate body 71 is formed with cut-outs or recesses 73*a*, including such a recess in immediate proximity to the outer end of the head 75 and such a recess in immediate proximity but spaced inwardly a distance from the transverse edge of the inner or instrument body end of the bar. At spaced intervals along and immediately adjacent the longitudinal edge 72 of the bar body 71 a series of small diameter holes or bores 72*a* is provided. In the edge 73 immediately adjacent the transverse edge of the bar 70 at the inner or body end thereof a recess 77 is provided to form at one side thereof the edge 78 inclined outwardly to the edge 73 in a direction toward the head end 75 of the bar and at the opposite side thereof to provide an edge 79 substantially normal to the plane of the edge 73. A transverse slot 80 is formed through the bar body 71 in position disposed longitudinally thereof approximately midway between the opposite edges 72 and 73 of the bar body, with this slot being positioned adjacent the end 74 of the bar body spaced a distance inwardly therealong from the recess 77.

The bracing bars 70 are bonded and secured in position at the inner or underside of the fret plate 14 of the finger board SB by plastic sprues keying through the holes or openings 72*a* along the edge 72 of each bar and by relatively thin plastic walls 72*b* along each side of the bar with these walls being integrally joined with and keyed into the finger board jacket 23. Walls 72*b* engage against the opposite sides of each bar 70 to clamp the bar therebetween. In order to further rigidly secure a bar 70 to the fret plate 14, the plastic walls 72*b* are thickened transversely at spaced intervals along the bar at locations thereon in line with the recesses 73*a*, respectively, in the edge 73 of the bar with these thickened portions of the walls being integrally joined through each recess with which aligned to thereby form, in effect, stirrups or ties at spaced intervals along a bracing bar to thereby strap or tie it to the fret plate 14 and the plastic covering wall or jacket 23 of that plate. Such thickened portions 72*c* are shown in Figs. 9 and 13 of the drawings in particular.

The length of the bracing bars 70 is such that in their assembled positions on and keyed to and along the underside of the finger board SB, the head ends 75 thereof project outwardly a distance beyond the outer or head end of the finger board SB, as will be clear by reference to Fig. 9. The head 21 of the neck body 20 is formed with spaced ribs 21*a* thereon disposed longitudinally thereof which provide seats on their upper surfaces onto which the head ends of the bars 70 seat and are supported. The head cover 21C in assembled position seats on the inclined edges 76 of the heads 75 of the bars 70 and, if desired, a rearwardly inclined plastic material platform 21*b* may be formed across the inner ends of the heads 75 for seating thereon of the inner end portion of the head cover 21C (see Fig. 9).

With the bracing bars 70 in position with the finger board SB mounted and assembled on and attached to the neck body 20, the inner ends of the bars extend into the body or bell B′ through the opening 20*e* of wall 20*d* and through the opening 9 in the body end wall 4 with the inner end edges of the bars located at the outer transverse edge of the wall 7 which is inset from the sounding board 5. Such assembled position of the bars 70 is clearly shown in Fig. 9 of the drawings. When the bars 70 are in such final assembled position and relation relative to the neck body 20 and the instrument body B′, the slots 80 of the bars are transversely aligned and lie in position in a plane above the transverse wall 20*b* of the end wall 20*a* of neck body 20. A metal plate 81 is secured in fixed position by its opposite ends in the aligned slots 80 and this plate is formed with a transverse bore 82 therethrough which is axially aligned with the bore 20*c* of the wall 20*b*. The bore 82 of plate 81 is tapped and the headed attaching screw 83 having a head 84 thereof engaged against wall 20*b* at the outer side of that wall is mounted in and extending through bore 20*c* with its opposite threaded end threaded into and through bore 82 of the plate 81. By sufficiently tightening up the attaching screw 83 the finger board component SB is firmly attached in position on and to the neck body 20 and the instrument bell B′, such attachment being in addition to the cementing as by a solvent type of cement of the side walls 24 of the finger board SB to the side walls 22 of the neck body 20.

A feature of my invention exemplified in a form thereof incorporated in the arrangement and combination of finger board SB with the integral neck body and bell of an instrument in the form of Figs. 9 and 10, resides in providing for angular adjustment of the composite neck and fret board component NI relative to the body B′. Referring to Figs. 9, 11 and 16, I carry out this feature by providing an adjustable plate member 90 which, at its upper or outer end is suitably pivotally secured by inwardly extended pins 91 to the bars 70 with this upper end of the plate being received in the cutouts or recesses 77 in the inner edges of the bars 70 adjacent the inner ends thereof within body B′. This plate 90 extends inwardly through body B′ and is inclined outwardly toward the body end wall 4 with the inner end of the plate being bent up to provide the flange portion 92 across the inner end thereof having threaded transversely therethrough the headed adjusting screw 93. A fixed plate 94 is secured in rigid position on and to the inner side of the bottom wall 1 at and to the inner adjacent side of the end wall 4 of the bell B′. This fixed plate is rotatably engaged by the inner end of the adjusting screw 93. The adjusting screw 93 is thus positioned at an angle, say of approximately 45 degrees, to the planes of the end wall 4 and bottom wall 1 of the bell B′ and extends inwardly and is inclined outwardly toward the top wall or sounding board B of the bell with the head 93*a* of such screw being located at the inner end thereof and being provided with the usual slot thereacross. Thus, it is apparent that the adjusting screw 93 is readily accessible for rotation by inserting a suitable instrument, such as a screw driver, through the sound opening 6 in the top wall or sounding board 5 of the instrument. By rotating the screw 93 to thread it inwardly through flange 92 in the proper direction the adjusting plate 90 is forced outwardly to apply forces to the inner ends of the bracing bars 70 to thereby adjust in relation to the tension of the instrument strings, the angular relationship of the composite neck component NI to the body or bell B′ of the instrument. By rotating the screw 93 to thread it outwardly through flange 92 the tension of the strings is permitted to take charge to the degree required for the angular adjustment of neck component NI in the opposite direction.

The instrument of Figs. 9 and 10 differs from the type of the instrument in the forms shown in Figs. 1 and 2, in that, instead of the strings being attached to a tailpiece as intended in the instrument of Fig. 1, the strings are attached to a bridge structure 111 which is secured and fixed on and disposed transversely of the outer side of the top wall or sounding board 5 of body B′ at a location intermediate the sound opening 6 and the outer end of the body. In this example this bridge structure may be considered to be molded integrally with and as a fixed part of the top wall 5, although from the standpoint of my present invention this bridge structure 111 may be formed as integral or as a separate structure attached and fixed to the top wall 5. In either instance the ends of the playing strings 110 are suitably releasably secured in spaced relation to and across the bridge structure. These strings 110 then extend from the bridge structure forwardly across the sound opening 6 and the finger board SB to the spindles of the tuning keys K at the head of the instrument under tension between the bridge structure and the tuning keys.

In Figs. 17, 18 and 19 I have disclosed a modified form of the type of integral bell and neck body instrument of Figs. 9 and 10, in which I substitute a solid wood or other material bracing and stiffening member 120 in the neck body 20 as the broad equivalent of the multiple bracing and stiffening bars 70 in the form of Figs. 9 and 10. This bracing bar or member 120 is in this instance of generally rectangular and approximately square cross-section, although not so limited, with a width less than the internal width or spacing between the side walls 22 of neck body 20 and the side flange walls 24 of the finger board component SB. In this form of the invention I provide at the underside of the composite finger board SB a series of transversely spaced, generally parallel plastic rib members 121 which are molded integrally with the covering wall or jacket 23 of the finger board and keyed thereby to and disposed longitudinally along the under or inner side of the fret plate 14 of the finger board by sprues of plastic extending through the fret plate. Referring to Fig. 17, these ribs 121 decrease progressively in depth or thickness inwardly from the outer head end of the finger board to the inner end of the finger board which extends over the inset wall 7 of the top wall or sounding board 5 of the instrument body. The depth or thickness of the bracing bar member 120, referring now to Figs. 18 and 19, is such that when assembled in position seated on and along the inner side of the bottom wall of the neck body 20 the opposite outer side of member 120 provides a seating surface therealong on and against which the inner or under surfaces of the ribs 121 engage and seat when the finger board SB is in assembled position attached on and to the neck body and the bell of the instrument. Thus, the bar 120 is engaged and held between neck body 20 and the finger board SB against relative movements between such members and forms therewith a rigid, internally braced component. The outer end 122 of member 120 extends over and seats on the ribs 21*a* on the head 21. The outer side of the end 122 of member 120 is inclined inwardly or rearwardly for the seating thereon of the head cover 21C. The inner end 123 of the bracing member 120 extends a distance into the bell or body B′ with its inner end at the outer transverse edge of the inset wall 7 across the opening 8 in such wall, as will be clear by reference to Fig. 17.

If desired or found expedient, the adjusting screw mechanism disclosed and described in connection with Figs. 9 and 10 may be incorporated in the form of the instrument having the bracing member 120. In such event the adjusting plate 90 will be connected with the inner end 123 of the bracing member 120 with the fixed plate 92 secured within the bell B′ and mounting the adjusting screw 93 in operative connection with the adjusting plate. While I have shown in Figs. 17 through 19, a form of solid, rectangular cross-section bracing member 120, it is contemplated and my invention includes such a single bracing member in the form of a hollow bar such as a rectangular cross-section metal or the like tube, as well as various other cross-sectional shapes for such a bracing member, either of hollow or solid form.

In the forms of my invention of Figs. 1 through 19, as hereinabove described, the neck body in each instance is formed of plastic material with only the upper or outer side thereof, that is, the finger board forming side, incorporating metal components to which the plastic wall covering or jacket is rigidly fixed and bonded, as by keying in the manner described. Such composite finger boards, whether formed as a separate component cemented or otherwise fixed to the neck body and bell, or formed integral therewith, have the metal components contained at and in the finger board without extension to or in the plastic neck body side walls or bottom wall, with the neck component then being preferably internally braced and stiffened by members such as the wood core of Figs. 1 and 2, the multiple bracing bars of Figs. 9 and 10, or the single bracing member of Fig. 17. However, in another form and embodiment of my invention, as disclosed in Figs. 20 through 32, the plastic neck body itself is formed with a metallic or other stiff, rigid component in the form of a shell, with the plastic body being keyed thereto and with this shell joining and forming an extension of a metal plate member providing the permanent frets formed up therefrom in accordance with such basic feature of my invention.

Referring to the embodiments of Figs. 20 through 32, the neck component N, that is the fretted finger board and neck handle forming portion thereof, is in this example in the form of a tubular or hollow metallic shell identified generally by the reference character S, which provides on its upper or outer side the finger board 30 with the integral frets F and F′ thereon, and which is completely encased or jacketed by the plastic jacket or casing P, except for the exposure therethrough at the outer side thereof of the frets. Such construction, by utilizing relatively thin metallic material for the shell and the plastic jacket P of substantial thickness relative to the thickness of the shell completely enclosing and covering the exterior of the shell as a substantially unbroken casing, provides a neck component of light weight yet of substantial strength and rigidity which can be quantity produced as a precision component at relatively low cost.

The metallic shell S, in this instance, is comprised of two (2) parts or members of different metals, the upper, fretted finger board forming member 40 which is in the form of a plate-like member stamped or formed-up by suitable dies from a blank of brass sheet, and the bottom part or member 50 which is stamped or pressed-up from a blank of cold rolled steel and onto which the fretted finger board forming top member of brass is rigidly secured and fixed to complete the shell.

For the purpose of keying the plastic casing or jacket P on and to the outer or finger board forming side of the metal fret forming member 40, a series of holes or bores 44 is provided through the top wall 41. In this particular example four (4) of such holes 44 are located spaced apart transversely of wall 41 at and immediately adjacent each side of each fret. As the spacing between the frets F progressively increases outwardly along the finger board to the first or master fret F′ an additional series of holes 44′ may be formed transversely spaced across the finger board along the transverse center line between each pair of adjacent frets. In this instance four (4) of such holes 44′ are provided between the 12th and 13th frets F and between each adjacent pair of frets outwardly of the finger board, as will be clear by reference to the drawings. As the length inwardly or outwardly of the finger board along which the plastic keying holes 44 and/or 44′ may be provided is not critical, the present example number, location and spacing is not disclosed by way of limitation.

The fret-forming, plate-like upper member 40 of the shell S is stamped up from brass sheet having a thickness of the order of 0.02″ to provide the slightly transversely arched or convex top wall 41 with the opposite longitudinal side, attachment flanges 42 extending throughout the length of this member. The frets F and F′ are pressed or drawn up from this top wall 41 in precise spacing therealong. The member 40 of the present example has additional plastic keying holes or bores 45 formed spaced apart along each flange 42 adjacent the top wall 41 of the member, with these holes 45 being preferably located immediately below and adjacent the ends of the frets F, so that they may function to aid the easy, smooth and equally distributed draw of material from the blank into the ends of the frets F adjacent thereto.

The lower or neck handle forming member 50 may be stamped or pressed up from cold rolled steel having a thickness of approximately the order of 0.0299″. Member 50 is a simple primary structure in the form of a channel or trough open throughout its upper or top side and providing side walls 51 joining in and integral with the bottom wall 52 on radii to give the underside of the member its transversely curved, convex form. This member 50 is provided at spaced intervals along each side wall 51 adjacent the upper edge 51*a* thereof with a series of outwardly pressed eyelets 53, as will be clear by reference to Figs. 15 and 21 of the drawings. The fretted finger board-forming, top member 40 of the metallic shell S is mounted on and over the open upper side of the bottom member 40 with the opposite sides 51 of the latter member received between the flanges 42 of member 40, so that the latter flanges are located along the exterior of the outer sides of the lower member 50. The flanges 42 of the member 40 are each formed with bores 46 therethrough along and adjacent the lower edges thereof in positions to receive the eyelets 53, respectively, of the bottom member 50, with the outer, exposed ends of these eyelets being spilled against the outer sides of flanges 42 to tightly, rigidly rivet and fix the two members 40 and 50 together in assembled position forming the shell S.

In order to key and bind the plastic casing or jacket P on and over the lower member 50 of the shell S, such member in this particular example is provided with three (3) series of holes or bores 54 through the bottom wall 52 with the bores of each series disposed in a straight line spaced apart along the member 50 from end to end thereof. Obviously, any other arrangement of such keying or bonding holes may be provided in any number as may be deemed necessary or expedient in any particular instance.

At the inner or bell mounting end of the shell S of this neck component N, the lower member 50 is provided with a pair of transversely spaced bores 55 therethrough immediately adjacent the inner end edge of the bottom wall 52 of the member. An identical pair of transversely spaced bores 56 are formed through the bottom wall 52 a distance inwardly from the bores 55. The bores 55 and 56 happen in this example to be of equal diameters. Spaced inwardly along the lower member 50 from the bores 56, another pair of bores 57 are formed through the bottom wall 52. These bores 57 in this example are of larger diameter than the bores 55 and 56, and are for the purpose of receiving therethrough and mounting therein the fastening bolts or screws by which the neck component N is securely and rigidly attached to the saddle structure of the bell in mounted and assembled position of the bell and neck component in the completed instrument.

It is to be here noted that the shell S is precision formed and shaped to correspond with and to determine the final shape and contour of the neck component N which is to be formed therewith by the plastic casing or jacket P of substantially uniform thickness thereon and therearound. And, as with the completed neck component N, the shell S progressively decreases in both width and depth from the inner, bell mounting end to the outer, head end thereof. Not only is this a preferable shape for the final neck component, but it also contributes to the operation of molding the plastic jacket P thereon, as it permits of the withdrawal of a molding core which is inserted into and occupies the space within the shell S.

In this example, the portion 60 of shell S, with which is formed the plastic jacketed head of the neck component, is pressed, drawn or stamped-up from a separate blank of cold rolled steel having substantially the thickness of the bottom member 50 of the shell. The head forming member 60 is pressed-up, drawn or stamped from a suitable blank to provide the base or bottom wall 61 having the upturned opposite edge flanges 62. At one end the head member 60 is shaped into the shank 63 of a width to be received and fit snugly into the open outer end of the fretted finger board-forming portion of the shell S. The opposite side flanges 63 are extended and continued as flanges or side walls 64 along and form with the narrowed width extension of the bottom wall 61, the shank 63 which is open at its upper side. In this instance the head forming member 60 is rigidly fixed and secured in the end of the lower member 50 of the shell by spot welding, although any other suitable fastening technique may be utilized if desired. This head member 60 is formed with a plurality of suitable plastic keying or bonding holes or openings 65 formed through the bottom wall 61 thereof. Bores 66 are formed through the bottom wall 61 of head member 60 for receiving the spindles or shaft members of the key unit 10 when the latter is assembled on member 60, as will be described and explained in detail hereinafter.

In the particular embodiment of the selected example of a shell S, the head member 60 is formed as a separate element suitably secured by the shank 63 into the open, head end of the bottom member 40. However, if desired, the head member 60 may be formed integral with the lower member 50 from a single blank of material to thereby form members 50 and 60 as a one-piece unit. While the fretted finger board and handle-forming portion of the shell S is in this instance formed of the separate members 40 and 50, the invention contemplates and includes the formation of these two members from a single blank to form them integral as a one-piece structure. In this example the members 40 and 50 are formed of different metals, namely brass and steel, but there is no intention or desire to limit the invention to either the specific metals of the example or to different metals, as these members may be formed of the same suitable material. The use of the sheet metal stamped or drawn-up to provide the members 40 and 50, as well as the head member 60, is not in all respects critical or a limitation of my invention. The members making up the shells may all be suitably cast or otherwise formed, or some of them may be cast while others are stamped or drawn, or the shell may be cast as an integral, one-piece component. One of the essential features of this shell structure of my invention is the precision formation of the frets F as integral parts of the top wall of the outer member or portion of the shell, together with the lightweight, rigidity and dimensional stability for the resulting shell structure.

The shell S which forms the frame or base structure for the composite neck component N, is suitably encased or jacketed by the outer side or exterior covering jacket P of high impact type plastic, which in the example here given, may be considered to be formed on and covering the exterior of the shell by injection molding a high impact type polystyrene thermoplastic, or other suitable plastic such as butyrate, ethocel or the like having the characteristic of withstanding elongation forces, on the shell while the latter is mounted in the molding cavity of a suitable injection mold. The thickness of the plastice jacket P of this specific example, may be taken to be of the order of $\frac{1}{16}''$ and this thickness is preferably although not essentially substantially uniform throughout the width, depth and length of the jacket, that is, throughout the area of the jacket walls. The preformed, integral frets F on the top wall 41 of the member 40 have a depth or height from the adjacent upper surfaces of the top wall 41 of the order of $\frac{1}{10}''$, with the result that these frets project upwardly or outwardly beyond the outer surface of the wall 31 of the plastic jacket P. Hence, these frets are exposed through the plastic wall 31 of the jacket P which covers the top wall 41 of member 40, and wall 31 forms with the exposed frets F the fretted finger board 30 of the neck component N. There is thus formed and provided a freted finger board having precison formed, positioned and spaced frets F which are of metal and integral with the top wall 41 of shell S, the base or string stopping surface of this finger board 30 between the frets F being formed and provided by the wall 31 of the plastic jacket P.

In the form of this example, the plastic jacket P is molded on the shell S in an injection mold with a core or mandrel removably inserted within and completely contact fitting the inner surfaces of and occupying the interior of the shell. In the mold set-up suitable core pins may be provided aligned with the bores 55, 56 and 57, respectively, to form the bores or openings 55*a*, 56*a* and 57a through the jacket P in continuation of bores 55, 56 and 57. Similarly suitable core pins may be provided to form the circular recesses in which are formed the position markers 31' in the finger board plastic wall 31. There is thus provided a completely enclosing plastic casing or jacket P which at the outer or upper side of the top wall 41 of member 40 of shell S is interrupted only by the integral frets F which extend therethrough, and at the underside is interrupted only by the bores 55a, 56a and 57a through the inner end portion thereof. The wall 31 of the jacket P provides the completely tight, unbroken plastic wall portions 31a between the frets F. The jacket P includes the opposite side wall portions 50a which join integrally with and along the portions 31a between frets F, and the transversely curved or convex wall portion 50b which extends along over and completely covering the under or handle forming side of the neck component. The wall 50b forms an integral, unbroken continuation of the opposite side walls 50a of the jacket for the length of the neck component, except for possible openings therethrough which may be left by suitable position pins used in the mold to support the shell.

The head forming member 60 in this example is only covered by the plastic jacket P over the underside thereof and along and over the outer sides of the opposite side wall forming flanges 62. The plastic jacket P thus forms a covering wall 61a over the underside of the head member and the outer side covering walls 62a over the opposite side flanges, with the walls 61a and 62a forming an integral continuation of the walls of the jacket which encases the finger board and handle forming portion of the shell structure S. The thickness of the plastic walls 61a and 62a on the head member 60 is substantially the same as the thickness of the walls of the remainder of the jacket, namely, of the order of $\frac{1}{16}''$. In the molding of the jacket, suitable core pins may be provided in the mold to form openings 66a in continuation of the bores 66, respectively, through the bottom wall 61 of the head forming member 60 for receiving therethrough the key shafts of a tuning key unit. As will be clear by reference to Fig. 24, the outer edges of the opposite side forming wall flanges 62 may be bent or flared outwardly to thus form when imbedded in the plastic walls 62a, suitable locking flanges to prevent lateral bending and displacement or separation of the plastic walls 62a from the wall forming flanges 62. In this particular example, the outer end of the head forming member 60 is formed open between the side wall flanges 62 for receiving and mounting therein a tuning key unit, or a indicated in Figs. 20, 21 and 24, an end wall 65 of plastic may be formed integral with the bottom wall 61a and side walls 62a as a part of jacket P.

The neck component N which includes the composite structure formed of the shell S encased or jacketed by the plastic casing P, provides a new article of manufacture which may be produced for sale and use as a complete fretted finger board neck and handle component separate from any particular instrument. Such a neck component forms a complete unit which may be used as a replacement for other fretted finger board and neck structures, or in the assembly of new instruments. The neck component unit N may, of course, be formed in any desired size and with any number and spacing of frets as may be required for assembly in and to provide the neck and fretted finger board for any particular instrument, other than the specific size and type of guitar of the selected example disclosed herein.

As with the molded plastic bell B, the plastic jacket P requires no substantial finishing operations in the sense required by a wooden component, when it comes from the mold but provides a polished and finished surface immediately ready for the market. Such plastic materials also offer a wide variety of colors and color effects.

The plastic jacket P is firmly, rigidly secured to and adhered on and enclosing the shell S by the bonding and keying provided by the keys of plastic in the keying holes 44, 44', 45, 54, and 65, as well as by the fact that the plastic shrinks in setting tightly onto and over the shell.

It will also be evident that various other modifications, variations, embodiments, equivalents, constructions, combinations, substitutions, eliminations and additions may be resorted to without departing from the broad spirit and scope of my invention, and hence I do not desire or intend to limit my invention and the various features thereof in all respects to the particular examples herein disclosed, except as may be required by any intended limitations thereto in any of the claims hereto appended.

What I claim is:

1. As a new article of manufacture a composite, fretted finger board for mounting on the neck component of a stringed musical instrument, comprising, a metallic plate member having formed therefrom integrally therewith a series of permanent frets thereon disposed transversely thereof and spaced apart longitudinally therealong; a plastic material wall covering the fretted side of said plate member between said frets with the frets exposed therethrough to form therewith a fretted finger board; and plastic material flanges formed integral with said plastic covering wall along opposite side edges thereof to provide opposite side walls for mounting said composite finger board on the neck component of a stringed musical instrument.

2. As a new article of manufacture, a composite neck and finger board component for a stringed musical instrument, comprising, in combination, a plastic material neck body and a metallic plate-forming member having a series of preformed, permanent frets thereon integral therewith disposed transversely thereof and spaced apart longitudinally therealong; and said metallic plate-forming member having said preformed frets thereon being fixed to a wall of said plastic material neck body in position located at and along the underside of such wall with said frets extending outwardly therethrough to positions exposed at the outer side thereof to form therewith the fretted finger board of said component.

3. A composite neck and finger board component for a stringed musical instrument, comprising, a plastic material, hollow neck body and a plate-forming metallic member provided with permanent frets thereon exposed through one side of said body to form with such side the fretted finger board for said component.

4. A composite neck and finger board component for a stringed musical instrument, comprising, a plastic material neck body and a relatively thin metallic plate-forming member having formed-up therefrom a series of permanent metallic frets thereon integral therewith and extending outwardly through one side of said plastic material body to the outer side thereof to form therewith the fretted fingerboard of said component.

5. As a new article of manufacture, a composite neck and finger board component for a stringed musical instrument, comprising, a hollow, elongated plastic material body including a bottom wall, opposite side walls and an outer side, finger board-forming top wall; a metallic plate-forming member having preformed thereon a series of permanent metallic frets integral therewith disposed transversely thereof and spaced apart longitudinally therealong; said metallic plate-forming member being rigidly keyed to said finger board forming top wall of said plastic body in position against and along the underside thereof; and said preformed, permanent metallic frets of said plate-forming member being exposed through and across the top side of said top plastic material wall to form therewith the fretted finger board of said neck component.

6. A composite neck and finger board component for a stringed musical instrument comprising, in combination, a hollow, plastic material neck body including a bottom wall, opposite side walls and an outer side, finger board-forming top wall; a metallic plate-forming member having preformed thereon a series of permanent metallic frets integral therewith; said metallic plate-forming member being provided with a series of keying holes therethrough and being positioned along the underside of said outer side wall; sprues of plastic material integral with said top side wall extending into said holes in said plate-forming member for rigidly keying said wall and member together; and said permanent metallic frets of said plate-forming member extending through said top wall to positions exposed at the outer side thereof to form therewith the fretted finger board of said neck component.

7. As a new article of manufacture, a composite neck and finger board component for a stringed musical instrument, comprising, a plastic material neck body providing along one side thereof a finger board forming plastic material wall; a plate-forming member provided with preformed, permanent frets spaced therealong, and said plate-forming member being keyed to and along the underside of said finger board forming plastic wall in position covered thereby between said permanent frets with said frets being exposed through said plastic material wall to form therewith the fretted finger board of said neck component.

8. As a new article of manufacture, a fretted finger board for a stringed musical instrument, comprising a metallic plate having frets formed-up on one side thereof, a plastic material jacket covering said plate between said frets and being bonded to said plate, and spaced bracing bars disposed longitudinally along and attached to said metallic plate at the side thereof opposite said plastic material jacket.

9. As a new article of manufacture, a fretted finger board for a stringed musical instrument, comprising a metallic fret plate having permanent frets formed-up on one side thereof, a plastic material jacket covering said plate between said frets and being plastic bonded to said plate, and spaced substantially parallel bracing bars disposed longitudinally of said fret plate at the side thereof opposite said plastic material jacket and being plastic bonded to said fret plate.

10. As a new article of manufacture a fretted finger board for a stringed musical instrument, comprising a metallic fret plate having permanent frets formed-up therefrom on one side thereof, a plastic material jacket covering said fret plate between said frets, said fret plate being provided with keying openings therein and said plastic material jacket being keyed to said plate by sprues of plastic material extending thereinto, spaced substantially parallel bracing bars disposed longitudinally along the side of said fret plate opposite said plastic material jacket, and said bracing bars being attached to said fret plate by plastic material engaged therewith and formed integral with said plastic material jacket and keying sprues therefor.

11. A composite neck and finger board component for a stringed musical instrument comprising, a plastic material neck body and a relatively thin metallic fret plate forming member having formed-up therefrom a series of permanent metallic frets thereon integral therewith and extending outwardly through one side of said plastic material body to the outer side thereof, and spaced bracing bars within said plastic material neck body in position disposed longitudinally therethrough and being plastic keyed thereto.

12. In a stringed musical instrument, in combination, a plastic material bell, having a bottom wall, opposite side walls, opposite end walls, and a sounding board forming top wall; a plastic material neck body of U-shape in cross-section formed integral with and extending outwardly from one end wall of said plastic bell; said neck body including a bottom wall and spaced opposite side walls; a composite finger board including a metallic plate member, a plastic wall on and covering the outer side of said plate member, and spaced metallic bracing bars disposed longitudinally along the inner side of said metallic plate member disposed longitudinally thereof and plastic attached thereto; and said composite finger board being mounted on and rigidly attached to said plastic material neck body in position on and closing the open side thereof with said bracing bars adapted to seat on and along the inner side of said bottom wall of said neck body in positions engaged between said bottom wall and said finger board.

13. In a stringed musical instrument, in combination, a plastic material bell having a bottom wall, opposite side walls, opposite end walls, and a sounding board forming top wall; a plastic material neck body formed integral with and extending outwardly from one end wall of said plastic bell; said neck body including a bottom wall, spaced opposite side walls and a finger board forming top wall; said finger board forming top wall including a metallic plate member extending longitudinally therethrough and therealong, and a plastic material wall substantially covering the outer side of said metallic plate member to form therewith a finger board; said finger board forming top wall of said neck body being extended inwardly a distance over and onto the outer side of said sounding board forming top wall of said plastic material bell; and spaced metallic bracing bars mounted in and extending longitudinally through said neck body engaged between the bottom wall of said body and the inner side of said finger board forming top wall of the said body.

14. In the combination as defined in claim 13, said bracing bars extending inwardly beneath said finger board forming top wall of said neck body for a distance into said bell.

15. In the combination defined in claim 13, said bracing bars being plastic bonded in fixed relation to said finger board forming top wall of said neck body.

16. In the combination as defined in claim 13, a transverse plate extending between and fixedly connecting said bracing bars adjacent the inner ends thereof, and an attaching member on said bell in adjustable connection with said plate.

17. In the combination as defined in claim 13, an adjusting mechanism for adjusting the angular relation of said neck body and finger board to said bell, said mechanism being comprised by an adjusting plate connected to the inner ends of said bracing bars within said bell, a fixed plate attached within said bell at the lower side thereof beneath the inner ends of said bracing bars, and an adjusting screw connecting said adjusting plate with said fixed plate on said bell.

18. In the combination as defined in claim 13 an adjusting mechanism for said neck body and finger board comprising an adjusting plate connected at its upper end to and across the rear ends of said bracing bars within said bell, a fixed member within said bell in the lower portion thereof at the adjacent end wall of said bell in position spaced outwardly from the rear ends of said bracing members, said adjusting plate being inclined downwardly and outwardly to said fixed member, and an adjusting screw connecting said adjusting plate and said fixed member, said screw being positioned inclined inwardly and outwardly toward the sounding board forming top wall of said bell and having an operating head at its inner end.

19. In a stringed musical instrument, in combination, a plastic material bell having a bottom wall, opposite side walls, opposite end walls and a sounding board-forming top wall; a plastic material neck body formed integral with and extending outwardly from one end wall of said plastic bell; said neck body including a bottom wall, spaced opposite side walls and a fretted finger board forming top wall; said fretted finger board forming top wall including a metallic plate member having preformed thereon integral therewith permanent metallic frets extending outwardly therefrom and spaced apart longitudinally therealong, and a plastic material wall covering said metallic plate between said frets with the frets projecting outwardly therefrom in exposed positions at the outer sides thereof to form therewith a fretted finger board; and a substantially rigid bracing member mounted and confined within said plastic neck body engaged between said neck body and said finger board; said bracing member being extended through said neck body from the outer end thereof to and a distance inwardly into said bell from the inner end of said neck body; and said fretted finger board-forming top wall of said neck body being extended inwardly a distance over and onto the outer side of said sounding board-forming top wall of said plastic material bell.

20. In a stringed musical instrument, in combination, a plastic material resonant bell having a bottom wall, opposite side walls, opposite end walls and a sounding board-forming top wall; a plastic material neck body formed integral with and extending outwardly from one end wall of said resonant bell; said neck body including a bottom wall and spaced opposite side walls with the side thereof opposite said bottom wall being open; a composite, fretted finger board secured in rigidly fixed position on said neck body over and closing the open side thereof; said composite fretted finger board being comprised of a metallic plate member having preformed therefrom transversely disposed permanent metallic frets spaced apart longitudinally therealong and extending outwardly therefrom, a plastic material wall over and covering the outer side of said metallic plate member between said frets thereon of less thickness than the depth of said frets, and opposite side plastic material walls integral with said covering wall; said composite fretted finger board being positioned on said neck body with the opposite side walls of the finger board seated on and along the outer edge portions of said side walls, respectively of said neck body to form with said neck body a composite neck component for the instrument.

21. In a stringed musical instrument, in combination, a plastic material bell having a bottom wall, opposite side walls, opposite end walls and a sounding board forming top wall; a plastic material neck body of U-shape in cross-section formed integral with and extending outwardly from one end wall of said plastic bell; said neck body including a bottom wall and spaced opposite side walls; a composite finger board including a metallic plate member, a plastic wall on and covering the outer side of said plate member and opposite side plastic material walls formed integral with said plastic covering wall; and said composite finger board being mounted on and rigidly attached to said plastic material neck body in position on and closing the open side thereof with the side walls of said finger board being seated on and along the outer edges of said neck body side walls, respectively.

22. In a stringed musical instrument, in combination, a plastic material resonant bell having a bottom wall, spaced opposite side walls, spaced opposite end walls and a sounding board forming top wall; a plastic material neck body of U-shape in cross-section formed integral with and extending outwardly from one end of said resonant bell; said neck body including a bottom wall and spaced opposite side walls with the open side thereof at the upper side of said bell; said end wall of said bell at said neck body being formed with an opening therethrough aligned with the interior of said neck body; a portion of said top wall of said bell between said opening in said end wall and a location spaced inwardly thereof being formed inset in a plane below the plane of the outer side of said top wall and said inset portion being formed with an opening therethrough aligned with said end wall opening; a relatively rigid bracing member mounted in and extending longitudinally through said U-shaped neck body; said bracing member being extended inwardly a distance into said bell through said end wall opening and being positioned in said opening in said inset wall; a composite finger board comprising a metal plate member and a plastic wall over and covering the outer side thereof and opposite side longitudinal walls of plastic material integral with said covering wall; and said composite finger board being mounted on and closing the upper open side of said neck body over and enclosing therewithin said bracing member with the opposite side walls of said finger board being seated on and along the outer edges of the opposite side walls of said neck body and said finger board being engaged on said bracing member; and said composite finger board extending inwardly onto said inset portion of said top wall of said bell over and covering said bracing member with the opposite side walls of said finger board being seated on said inset portion of said bell top wall.

References Cited in the file of this patent

UNITED STATES PATENTS

| | | |
|---|---|---|
| 272,033 | Edge | Feb. 13, 1883 |
| 332,538 | Kelly | Dec. 15, 1885 |
| 497,973 | Wolfram | May 23, 1893 |
| 524,428 | Waring | Aug. 14, 1894 |
| 852,407 | Galbraith | Apr. 30, 1907 |
| 1,784,780 | Bronson | Dec. 9, 1930 |
| 2,101,364 | Dopyera | Dec. 7, 1937 |
| 2,297,309 | Limbert | Sept. 29, 1942 |
| 2,705,346 | Schlabach et al. | Apr. 5, 1955 |